(12) United States Patent
Kim et al.

(10) Patent No.: US 7,168,080 B2
(45) Date of Patent: Jan. 23, 2007

(54) OPTICAL DISC DRIVE AND METHOD

(75) Inventors: Seung-hoon Kim, Suwon-si (KR); Young-woo Huh, Suwon-si (KR); Chung-ung Kim, Yongin-si (KR); Pil-je Cho, Yongin-si (KR); Young-sun Jung, Siheung-si (KR); Sung-hun Lee, Suwon-si (KR); Kyu-hyeong Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 331 days.

(21) Appl. No.: 10/779,821

(22) Filed: Feb. 18, 2004

(65) Prior Publication Data

US 2005/0097582 A1    May 5, 2005

(30) Foreign Application Priority Data

Feb. 20, 2003 (KR) ............... 10-2003-0010728
Jul. 19, 2003 (KR) ............... 10-2003-0049549

(51) Int. Cl.
*G11B 17/028* (2006.01)

(52) U.S. Cl. .................................. 720/604
(58) Field of Classification Search ............... 720/604
See application file for complete search history.

(56) References Cited

U.S. PATENT DOCUMENTS

| 6,160,780 A * | 12/2000 | Furukawa et al. ......... 720/604 |
| 6,246,654 B1 * | 6/2001 | Omori et al. ............. 720/604 |
| 6,907,611 B1 * | 6/2005 | Konno et al. ............. 720/604 |
| 2002/0044521 A1 * | 4/2002 | Sogawa et al. ............ 369/270 |
| 2002/0179465 A1 * | 12/2002 | Hui ..................... 206/310 |

FOREIGN PATENT DOCUMENTS

JP    6-68574    3/1994

OTHER PUBLICATIONS

Notice of Office Action issued by the Korean Patent Office on Apr. 28, 2005 regarding corresponding Korean application.

* cited by examiner

*Primary Examiner*—Hoa Thi Nguyen
*Assistant Examiner*—Mark Blouin
(74) *Attorney, Agent, or Firm*—Staas & Halsey LLP

(57) ABSTRACT

An optical disc drive includes a main body at which a spindle motor is installed. A tray installed at the main body is loadable/unloadable into/from the main body, and a disc holder is rotatable by the spindle motor when the tray is in a loaded position, and is joinable to a clamping hole of a disc so as to fix the disc.

20 Claims, 15 Drawing Sheets

OPTICAL DISC DRIVE AND METHOD

CROSS-REFERENCE TO RELATED APPLICATIONS

This application claims the benefit of Korean Patent Application No. 2003-10728, filed on Feb. 20, 2003, and Korean Patent Application No. 2003-49549, filed on Jul. 19, 2003, in the Korean Intellectual Property Office, the disclosure of which is incorporated herein by reference.

BACKGROUND OF THE INVENTION

1. Field of the Invention

The present invention relates to an optical disc drive, and more particularly, to an optical disc drive having a slideable tray installed in a main body.

2. Description of the Related Art

In general, an optical disc drive is a device which emits light on a disc-shaped optical medium (hereinafter, referred to as an optical disc), such as a CD (compact disc), DVD (digital versatile disc), or the like, to record information onto the optical disc or to read information from the optical disc.

FIG. 1 is a plan view illustrating one example of a conventional optical disc drive.

Referring to FIG. 1, a main body 50 including a main frame 10 and a deck portion 30 and a tray 20 are shown. The slideable tray 20 is installed at the main frame 10. Rails 11 are provided along the main frame 10 to guide a sliding motion of the tray 20. Usually, the rails 11 are formed integrally with the main frame 10. In addition, a loading motor 13 providing power to slide the tray 20, and a pinion gear 14 driven by the loading motor 13, are positioned on the main frame 10. A rack gear 22 connectable to the pinion gear 14 is positioned under the lower surface of the tray 20.

The deck portion 30 includes a spindle motor 31 to rotate a disc 90, and an optical pickup portion 32 to access the disc 90 while sliding in a radial direction of the disc 90. The deck portion 30 is installed on the main frame 10, and raised toward the lower surface of the disc 90 when the tray 20 is loaded, and lowered when the tray 20 is unloaded, by the action of a cam (not shown) mechanically connected to the loading motor 13.

Upon loading the disc 90, the disc 90 is mounted on a mounting surface 21 of the tray 20, and the loading motor 13 is rotated. The pinion gear 14 is then rotated, the rotational force of the pinion gear 14 is transmitted to the rack gear 22, and the tray 20 begins to slide. When the tray 20 is at least partially loaded, the deck portion 30 is raised. When the disc 90 is seated on a turntable 34 provided at the rotatable shaft of the spindle motor 31, the disc loading is completed. When the loading is completed, the disc 90 is rotated as the spindle motor 31 rotates. The optical pickup 32 accesses the disc 90 through a window 25 while sliding in the radial direction of the disc 90, to record information onto the disc 90 and/or reproduce information from the disc 90. The process of unloading the disc 90 is the reverse of the above-described loading process.

The tray 20 includes a mounting surface 21. The mounting surface 21 is an area on which the disc 90 is mounted, and has a circular recess stepped downward from the upper surface 24 of the tray 20. A diameter D1 of the mounting surface 21 is slightly longer than a diameter of the disc 90. The mounting surface 21 has a center portion concentric with the rotatable shaft of the spindle motor 31 when the tray 20 is loaded. When the disc 90 is mounted on the mounting surface 21, the outer circumference of the disc 90 is guided by the outmost circumferential wall of the mounting surface 21 stepped from the upper surface 24 of the tray 20, and the center of the disc 90 substantially coincides with that of the mounting surface 21. With this configuration, when the tray 20 is loaded, the disc 90 is stably seated on the turntable 34 since the center of the disc 90 substantially coincides with the rotatable shaft of the spindle motor 31.

However, recently, the disc 90 may vary in diameter. That is to say, in case of the CD, while a circular CD having a diameter of 120 mm is generally used, a circular CD having a diameter of 80 mm is also used. To accommodate the difference, the mounting surface 21 is formed to accommodate the circular CD having a diameter of 120 mm, and a second mounting surface 23 is formed to make a circular recess stepped downward from the mounting surface 21 so that the circular CD having a diameter of 80 mm can be used. Since CDs may have different diameters, with the conventional apparatus having stepped mounting surfaces 21 and 23 as in the conventional optical disc drive shown in FIG. 1, it is difficult to guide and stably seat circular CDs of various sizes on the turntable 34.

In addition, recent CDs are not only circular in shape. Discs of various shapes, such as a calling card shape, a flower shape, a Christmas tree shape, or the like, so-called fashion discs, are used. Since such fashion discs do not have a standard size and shape, with the conventional apparatus having the stepped mounting surfaces 21 and 23, as in the conventional optical disc drive shown in FIG. 1, it is difficult to guide and stably seat discs of various shapes on the turntable 34.

In addition, the optical disc drive may be installed as a vertical-type drive as shown in FIG. 2. To narrow the footprint of a computer, many half-height type optical disc drives are installed as vertical-type drives. In this case, a problem occurs in that the disc 90 cannot be properly seated on the turntable 34, since the disc 90 tends to move in the direction of arrow A in FIG. 2.

In an attempt order to properly seat the discs, hooking projections 26 may be formed to extend from the upper surface 24 of the tray 20 to the mounting surface 21 as shown in FIG. 2. However, such hooking projections 26 are only beneficial when the same size discs are used, and are not applicable when fashion discs having various sizes and shapes are used.

SUMMARY OF THE INVENTION

To solve the above-described and/or other problems, the present invention provides an optical disc drive having an improved structure to mount one of a plurality of discs having various sizes and shapes, including a disc fixing structure separated from a spindle motor and positioned at a tray.

Accordingly, it is an aspect of the present invention to provide an optical disc drive including a main body with a spindle motor, a tray positioned with respect to the main body so as to be loadable/unloadable into/from the main body, and a disc holder rotated by the spindle motor when the tray is in a loaded position and joined to a clamping hole of a disc so as to fix the disc.

According to an aspect of the present invention, the spindle motor is fixedly installed at the main body. The disc holder is joinable to one end of a rotatable shaft installed at the tray to be rotated, a first gear is joinable to the other end of the rotatable shaft, and the spindle motor has a second gear connectable to the first gear.

According to an aspect of the present invention, the spindle motor is installed to be movable in an upward and downward direction with respect to the disc holder.

According to an aspect of the present invention, a first coupler is provided at the disc holder, and a second coupler is provided at the rotatable shaft of the spindle motor connectable to the first coupler, in a male-female manner, as the spindle motor is moved upward.

According to an aspect of the present invention, the disc holder is joinable to one end of a rotatable shaft that is installed at the tray to be rotated. A first coupler is joinable to the other end of the rotatable shaft, and a second coupler is provided at the rotation shaft of the spindle motor connectable to the first coupler in a male-female manner as the spindle motor is moved upward.

According to an aspect of the present invention, the disc holder is magnetically connectable to the spindle motor so as to be rotated by the spindle motor. A magnet is joinable to the rotation shaft of the spindle motor, and the disc holder has a member magnetically attachable to the magnet. Alternatively, a magnet is joinable to the disc holder, and the spindle motor has a member magnetically attachable to the magnet at the rotatable shaft thereof.

According to an aspect of the present invention, a tray with a disc holder includes an engagement portion recessed inwardly along the side surface of the disc holder, and a guiding portion having an opening at a side thereof. Elastic arms at the opening prevent the disc holder from escaping from the guiding portion through the opening when the engagement portion is engaged with the guiding portion. The disc holder is insertable into the guiding portion through the opening. An insertion hole is provided at the disc holder so that the rotatable shaft of the spindle motor is insertable into the insertion hole.

According to another aspect of the present invention, a disc holder is installed on a tray having a circular opening, and first and second members on the disc holder are vertically joined to each other to form an engagement groove that is engageable with the circular opening. The first and second members are joined to each other from the top and bottom of the tray through the opening so that the disc holder is installed at the tray to be rotated. An insertion hole is formed at the second member so that the rotatable shaft of the spindle motor is insertable into the insertion hole.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
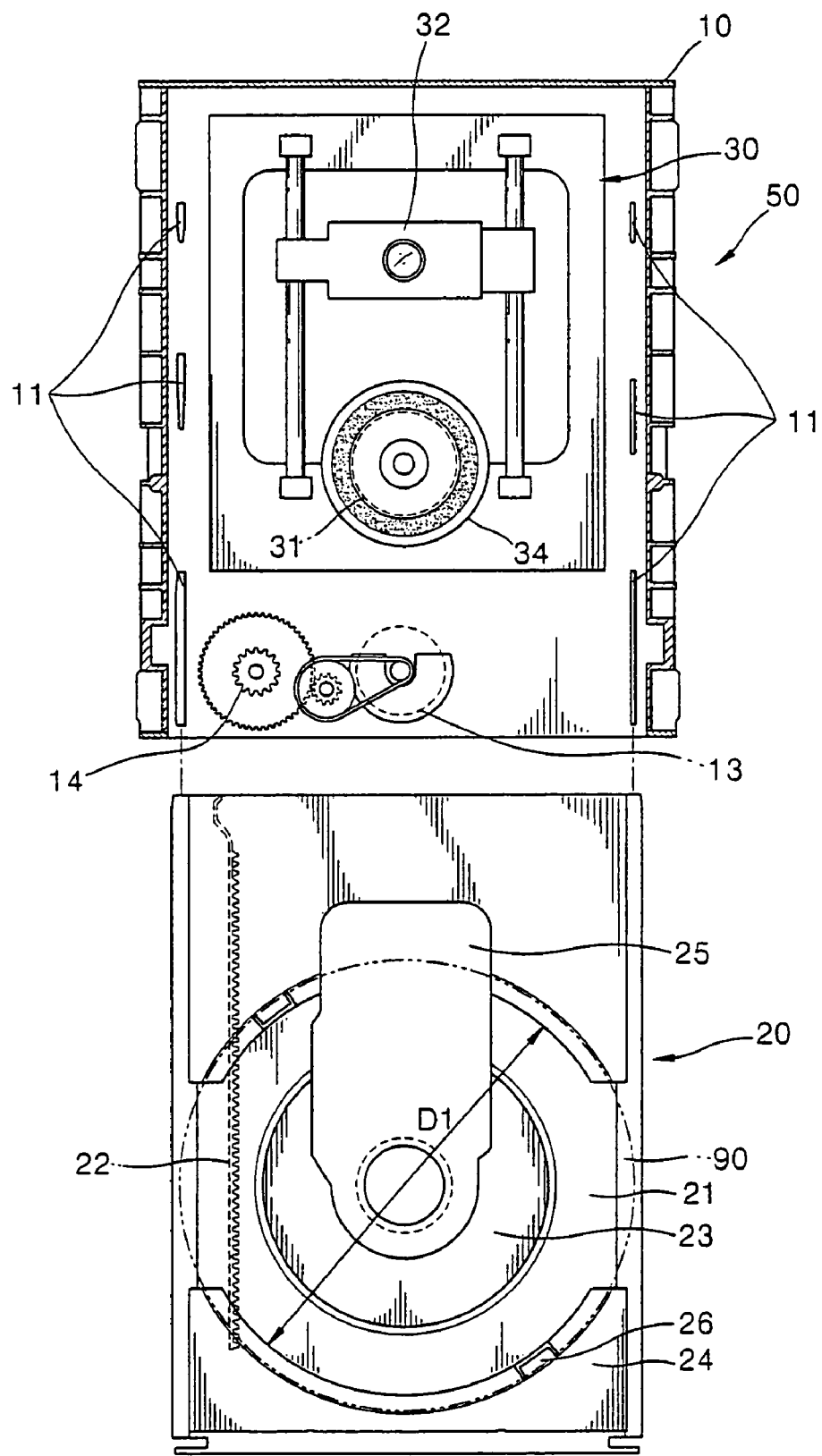
FIG. 1 is a plan view illustrating an example of a conventional optical disc drive.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
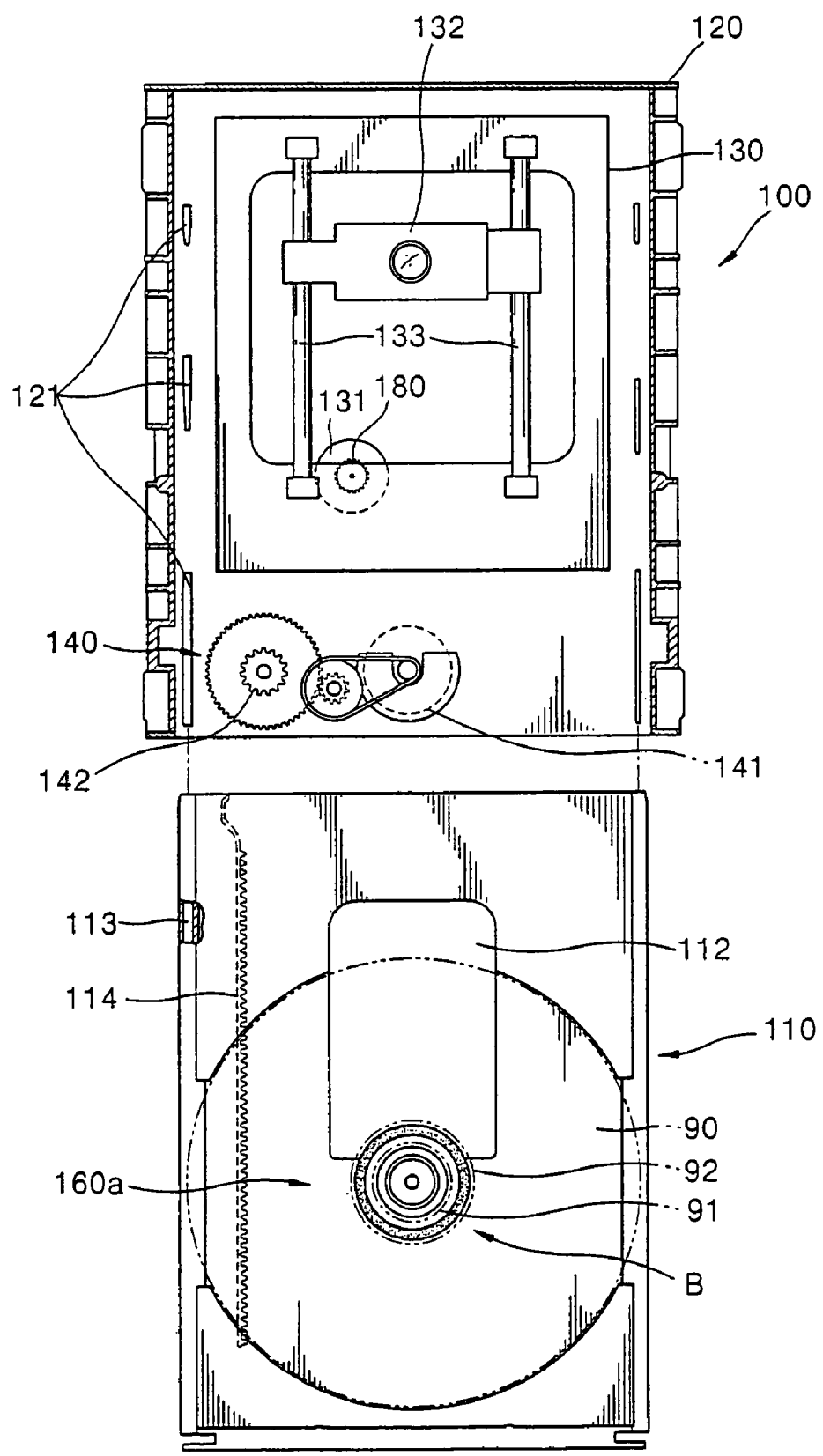
FIG. 3 is a plan view illustrating an aspect of an optical disc drive according to the present invention.
Figure 4:
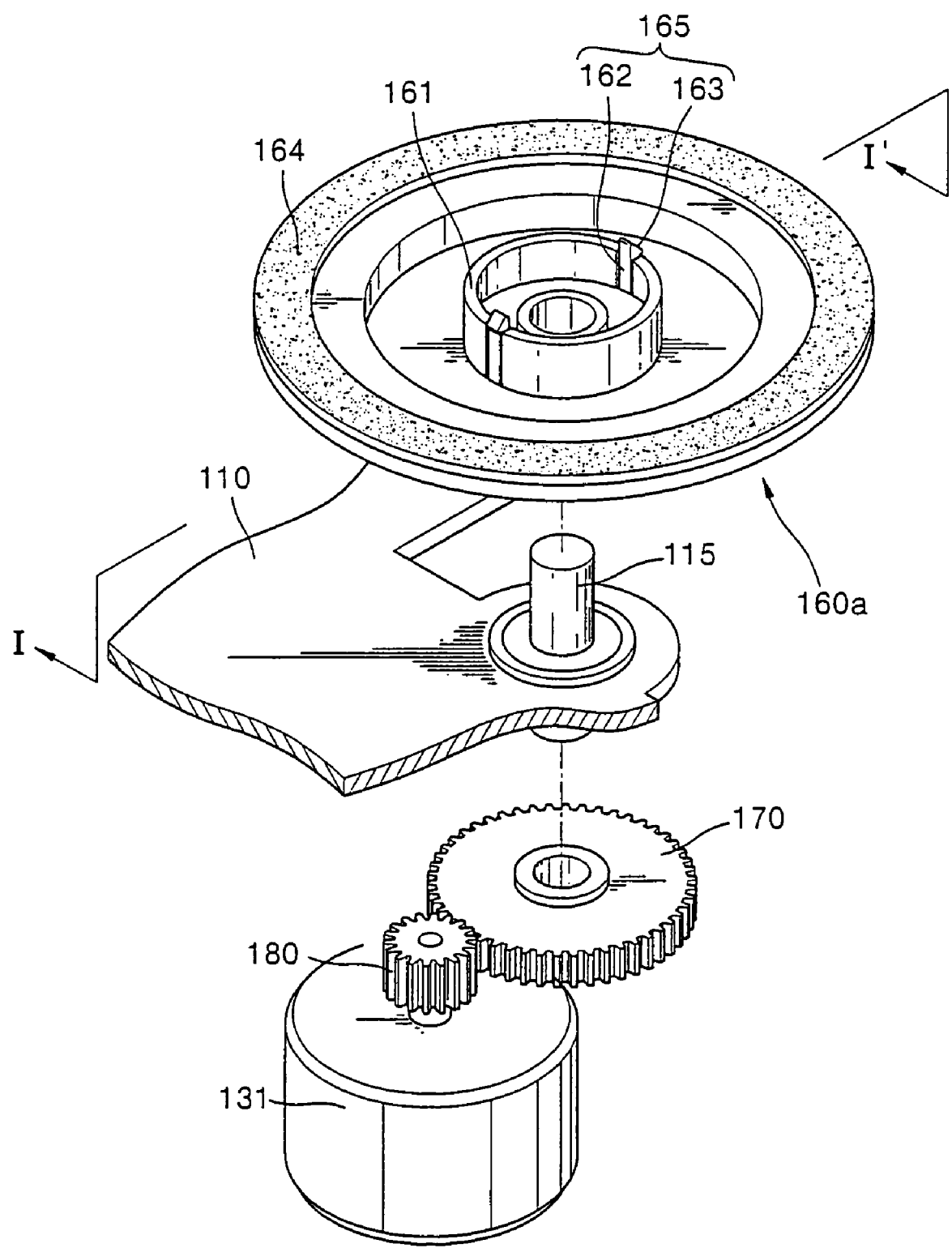
FIG. 4 is an exploded perspective view illustrating B portion of FIG. 3 in detail.

FIG. 3 is a plan view illustrating one embodiment of an optical disc drive according to an aspect of the present invention, and FIG. 4 is an exploded perspective view illustrating portion B of FIG. 3 in detail. In addition, FIG. 5 is a section view taken along the line I–I' of FIG. 4.

Figure 5:
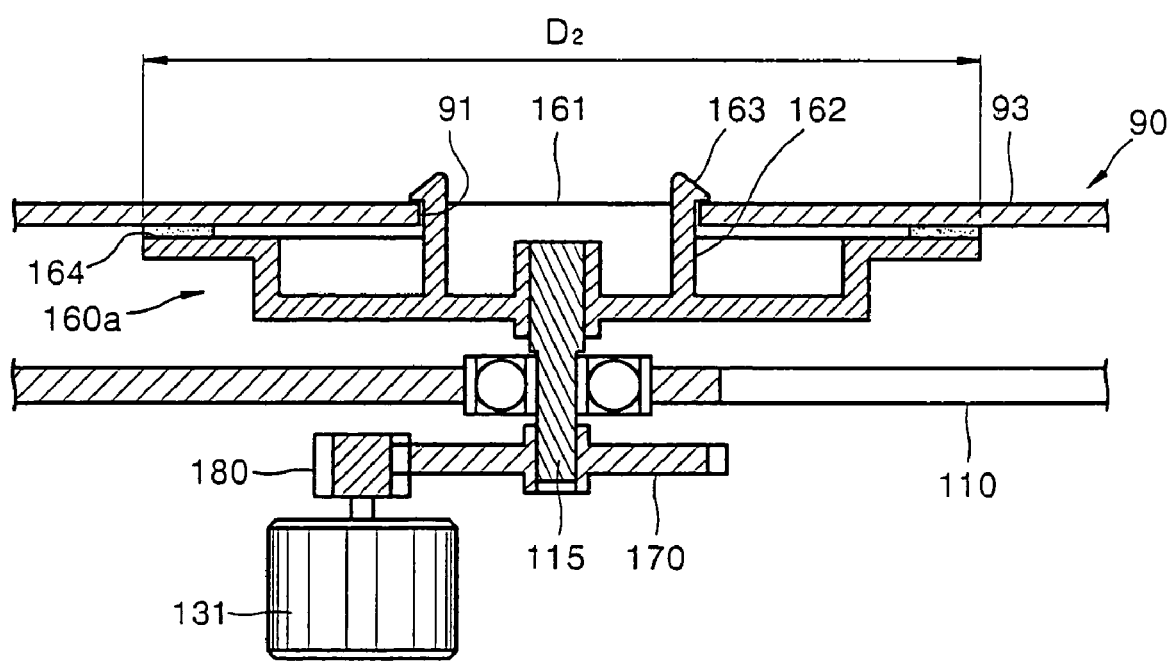
FIG. 5 is a section view taken along the line I–I' of FIG. 4.

Referring to FIGS. 3 through 5, a main body 100 and a tray 110 are shown. The main body 100 includes a spindle motor 131 to rotate a disc 90, an optical pickup 132 to access the disc 90 and record information onto the disc 90 and/or reproduce information from the disc 90, and a loading portion 140. The spindle motor 131 and the optical pickup 132 are attached to a deck 130 and the deck 130 is installed on a frame 120. The loading portion 140 is installed at the frame 120.

The tray 110 is installed at the main body 100 so as to be able to slide. Rails 121 are provided at both edge sides of the frame 120 to guide a sliding movement of the tray 110. According to an aspect of the present invention, rails 121 project from the base surface of the frame 120 in the shape of ribs. Alternatively, a rail 121 has a plurality of divided portions, and formed in the shape of one long rib.

A window 112 is formed in the tray 110 so that the optical pickup 132 can access the disc 90. Guide grooves 113, engageable with the rails 121, are along both edge sides, of the tray 110. A first rack gear 114, engageable with a pinion 142, is positioned at the lower surface of the tray 110 in a direction of sliding movement of the tray 110.

A disc holder 160*a* is formed in the tray 110. Referring to FIGS. 4 and 5, the disc 90 is mountable and fixable to the disc holder 160*a*. The disc holder 160*a* is rotated by the spindle motor 131 when the tray 110 is in a loaded position. The disc holder 160*a* has a joining portion 161, around which a clamping hole 91 at the center portion of the disc 90 is to be fitted, and a fixing portion 165, to fix the disc 90 to the joining portion 161.

According to an aspect of the present invention, the joining portion 161 has a cylindrical shape, the diameter of which is slightly smaller than that of the clamping hole, and the height of the joining portion 161 is the same as, or is slightly greater than, that of the upper surface 93 of the disc 90. The fixing portion 165 has hook arms 162, as shown in FIGS. 4 and 5, formed by, for example, cutting portions of the cylindrical joining portion 161. Hooks 163 project at the respective end portions of the hook arms 162 so as to hook the upper surface 93 of the disc 90. When the disc 90 is fitted around the joining portion 161, the clamping hole 91 is fitted around the joining portion 161 and the hook arms 162 are slightly bent inward. The hooks 163 hook edge portions of the clamping hole 91 when the hook arms 162 return to their original positions. A friction member 164 prevents the disc 90 from slipping on the upper surface of the disc holder 160a when the disc holder 160a rotates. The maximum diameter D2 of the disc holder 160a is the same as, or is slightly smaller than, that of a clamping zone 92.

As shown in FIGS. 4 and 5, a rotatable shaft 115 is installed in the tray 110. The rotatable shaft 115 is installed to pass through the tray 110 and to project at both ends. The disc holder 160a and a first gear 170 are joined to the upper and lower ends of the rotatable shaft 115, respectively.

A second gear 180 is joined to the rotatable shaft of the spindle motor 131. The second gear 180 is installed to engage with the first gear 170 when the tray 110 is in the loaded position. Although not shown in the drawings, at least one connecting gear (not shown) is installed between the first and second gears 170 and 180. Although not shown in the drawings, the spindle motor 131 is installed so that the spindle motor 131 slides toward the first gear 170 as the tray 110 is loaded, and the second gear 180 engages with the first gear 170 when the tray 110 is loaded completely.

The optical pickup 132 is installed to be able to slide along guide shafts 133 provided at the deck 130. When the tray 110 is loaded completely, the optical pickup 132 accesses the disc 90 through the window 112 to record information onto the disc 90 and/or reproduce information from the disc 90.

The loading portion 140 includes a loading motor 141 and the pinion 142. The pinion 142 is driven by the loading motor 141. The pinion 142 engages with the first rack gear 114 formed at the tray 110 to load/unload the tray 110.

The operation of a disc according to an aspect of the invention is described as follows.

As shown in FIG. 3, the tray 110 is unloaded,]. The disc 90 is mounted on the disc holder 160a. As previously described, since discs have various sizes and shapes, it is difficult for discs of various sizes to be guided so as to stably seat on the turntable 34 when those discs are mounted on the tray 20 of the conventional optical disc drive shown in FIG. 1.

Figure 2:
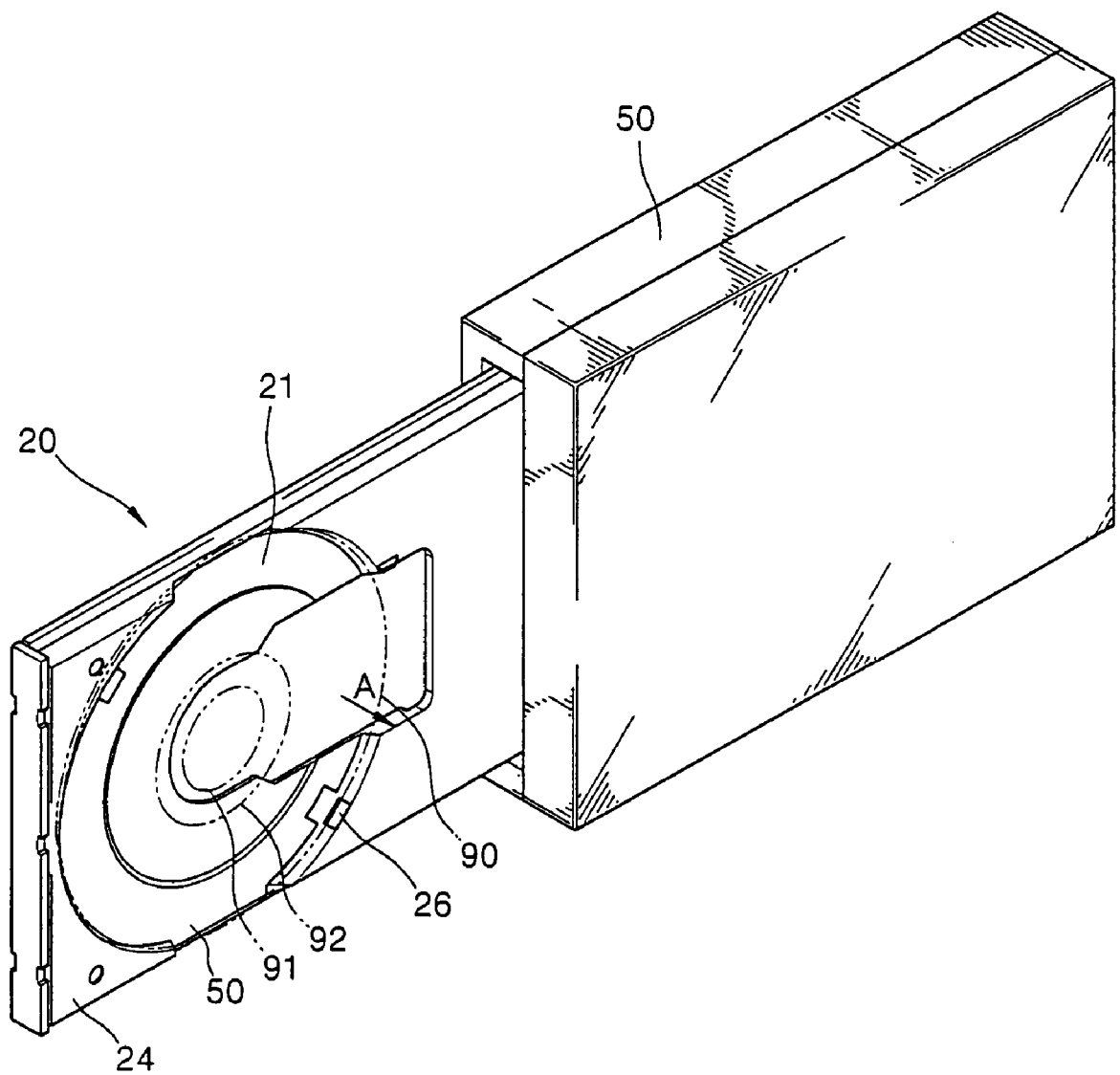
FIG. 2 is a perspective view illustrating the conventional optical disc drive of FIG. 1 installed as a vertical type drive.

In addition, as previously described, the optical disc drive may be installed as a vertical-type drive as shown in FIG. 2. In particular, to narrow the footprint of a computer, many half-height type optical disc drives are installed in computers as vertical-type drives. In this case, a problem occurs in which the disc 90 is not properly seated on the turntable 34 since the disc 90 tends to move in the direction of arrow A in FIG. 2. The hooking projections 26 shown in FIG. 2 are only applicable when the same size discs are used, and are not applicable when fashion discs are used.

The dimensions of the clamping zone 92 and the clamping hole 91 are in accordance with DVD standards. For example, in the case of a DVD, it is defined in the DVD standards that the diameter of the clamping hole 91 shall be 15 mm, and the diameter of the clamping zone 92, concentric with the clamping hole 91, shall be 33 mm. Since the disc holder 160a, including the joining portion 161 around which the clamping hole 91 is fitted and the fixing portion 165 to fix the disc 90 to the disc holder 160a by hooking the edge portions of the clamping hole 91, is installed at the tray 110, even an irregularly shaped disc, such as a fashion disc, is mountable on the tray 110 in a desired position. In addition, even when the optical disc drive is installed as a vertical-type drive, the problem of the disc 90 tending to move in the direction of arrow A, as in the conventional optical disc drive shown in FIG. 2, does not occur.

When the disc 90 is mounted on the disc holder 160a, the loading motor 141 begins to rotate. Then, as the pinion 142 that is engaged with the first rack gear 114 is rotated, the tray 110 begins to be loaded into the main body 100. When the tray 110 is completely loaded into the main body 100, the first gear 170 engages with the second gear 180. Therefore, when the spindle motor rotates, the disc holder 160a is rotated together with the disc 90.

As described above, with the optical disc drive according to an aspect of the present invention, the disc holder 160a rotatable by the spindle motor 131 is in the tray 110, and therefore discs having various sizes and shapes are mountable into the tray 110 loaded into the main body 100. In addition, since the disc 90 is fixable to the disc holder 160a, the disc 90 is stably loaded into the optical disc drive even when the optical disc drive is used as a vertical-type drive.

The above described aspect of the present invention relates to the optical disc drive in which the spindle motor 131 is fixedly installed in the main body 100. The spindle motor 131 is upwardly and downwardly movable with respect to the disc holder 160a. According to an aspect of the present invention, the moving of the spindle motor 131 in upward and downward directions uses the loading motor 141.

Figure 6:
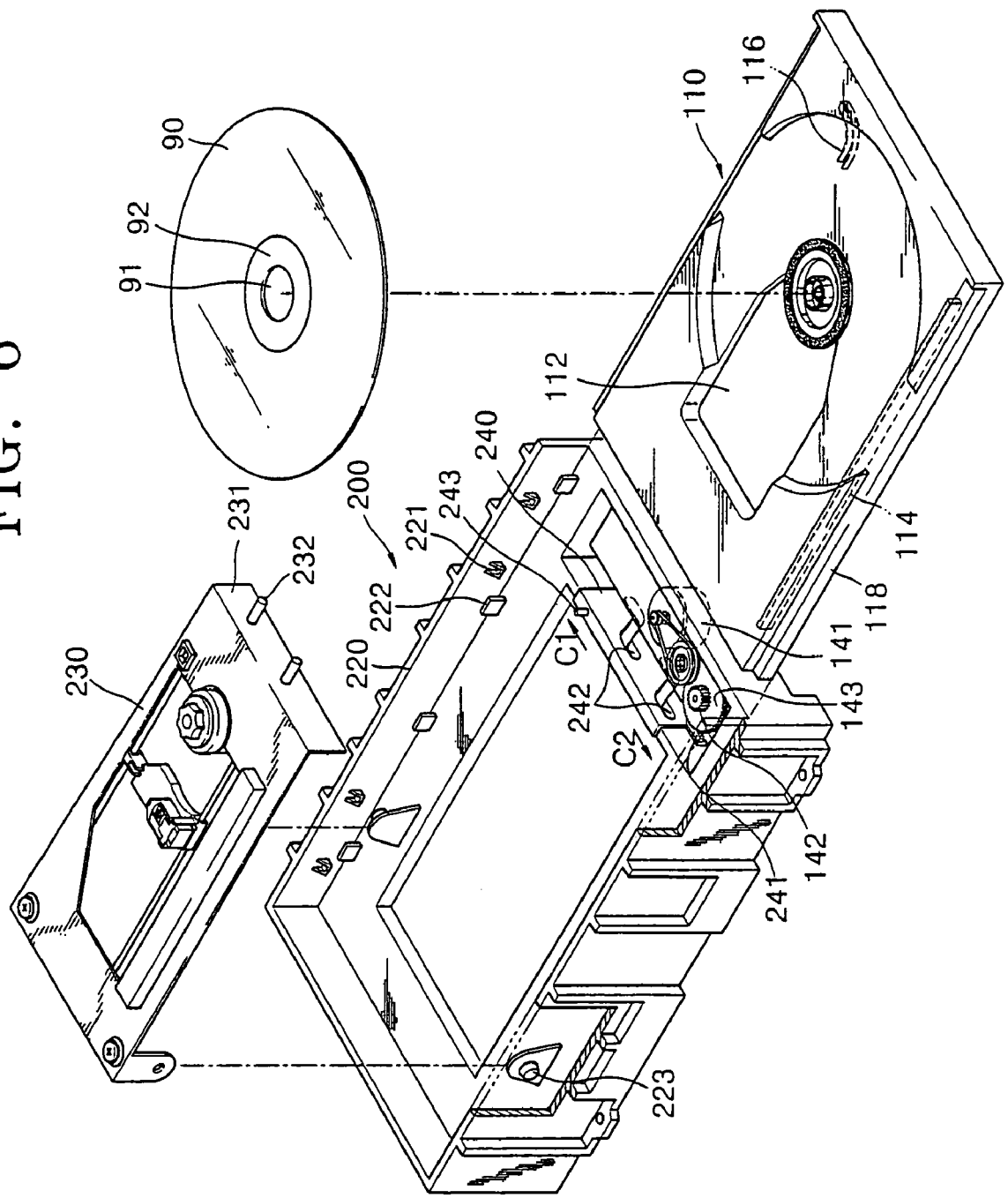
FIG. 6 is an exploded perspective view illustrating another aspect of an optical disc drive according to the present invention.

FIG. 6 is an exploded, perspective view illustrating another aspect of an optical disc drive according to the present invention.

Referring to FIG. 6, a deck 230, having a spindle motor 131 and an optical pickup 132, incldes a loading motor 141, a third gear 143, and a cam member 240. The third gear 143 is integral with a pinion 142. A slideable tray 110 is installed to a main body 200. Opposingly facing guide members 221 and 222 are provided in a frame 220 so as to guide the sliding movement of the tray 110. Rails 118, insertable between the guide members 221 and 222, are provided along the sides of the tray 110.

The loading motor 141 loads/unloads the tray 110 by rotating the pinion 142 engageable with a first rack gear 114 installed at the tray 110.

The deck 230 is joined to a shaft 223 on the frame 220, and two shafts 232 are on the front surface of the deck 230. A second rack gear 241 engageable with the third gear 143 and two first cam tracks 242 to which the two shafts 232 are fitted are formed at the cam member 240. A boss 243 is provided at the cam member 240, and a second cam track 116 engageable with the boss 243 is provided at the lower surface of the tray 110. When the tray 110 is slid, the second rack gear 241 is separated from the third gear 143. As the tray 110 nears the loaded position, the cam member 240 is moved a short distance in the direction of arrow C1 in FIG. 6 by interaction of the second cam track 116 and the boss 243, and the second rack gear 241 is engaged with the third gear 143. As loading of the tray 110 nears completion, the first rack gear 114 is separated from the pinion 142. As the loading motor 141 continues to rotate, the cam member 240 is moved in the direction of arrow C1, and the deck 230 is raised by an interaction of the first cam track 242 and the shaft 232. The unloading process of the tray 110 is the reverse of the above-described loading process. When the tray 110 is loaded, the cam member 240 is moved in the direction of arrow C1, and the deck 230 is raised, and when the tray 110 is unloaded, the cam member 240 is moved in the direction of arrow C2, and the deck 230 is lowered.

Figure 7:
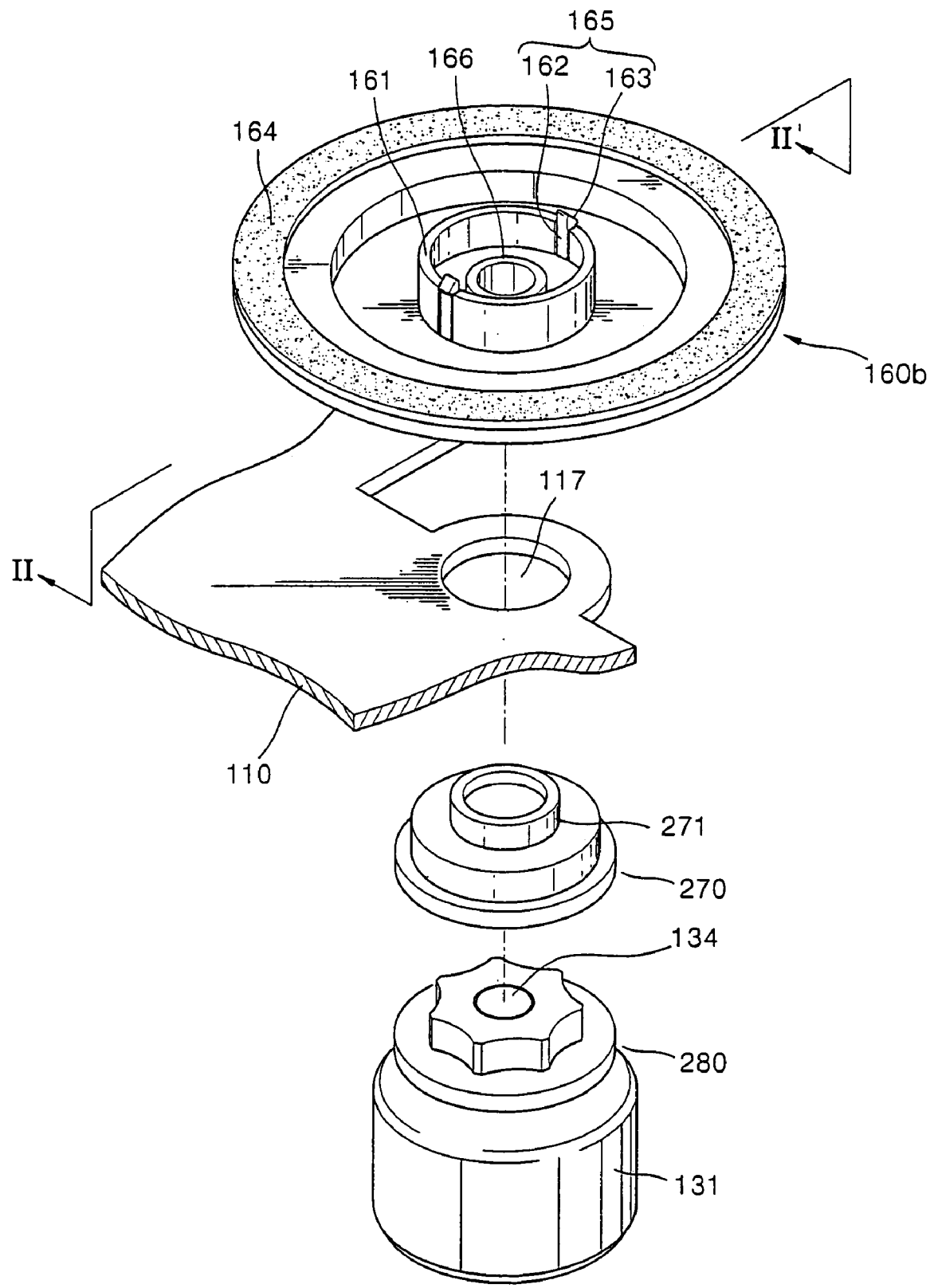
FIG. 7 is an exploded perspective view illustrating one example of a power transmitter.

The rotational force of the spindle motor is transmitted to the disc holder by various power-transmitter. FIG. 7 is an exploded perspective view illustrating one example of a power transmitter, and FIG. 8 is a section view taken along the line II–II' of FIG. 7.

Figure 8:
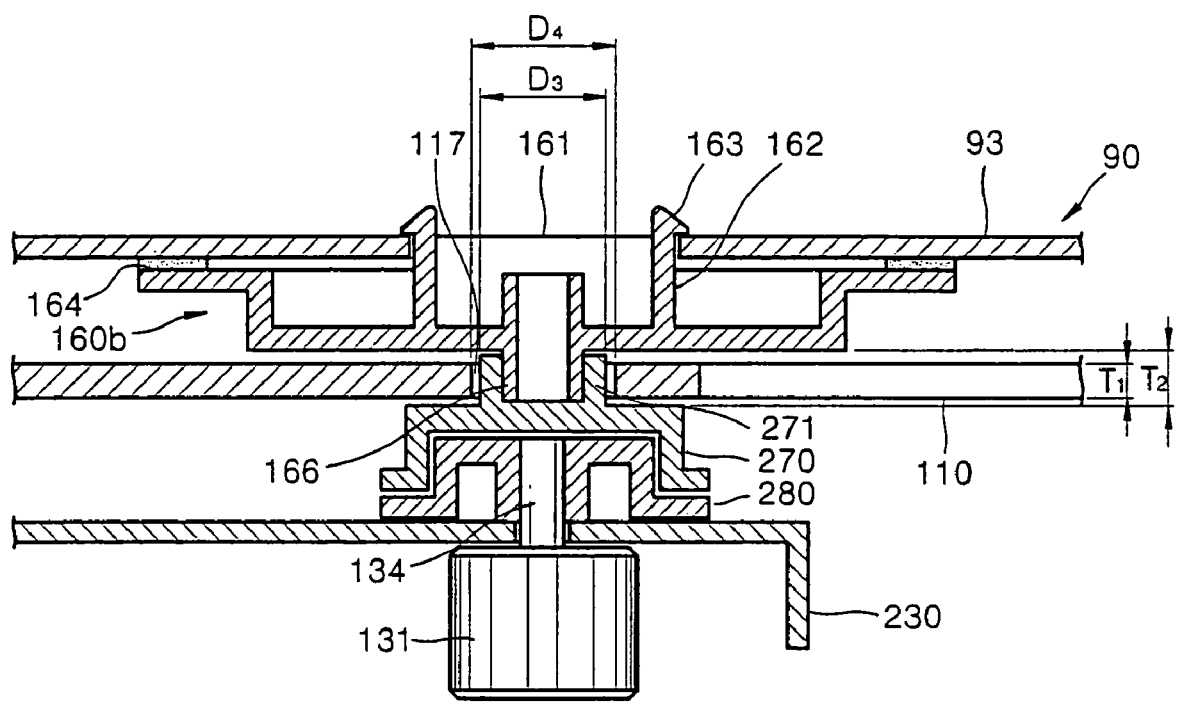
FIG. 8 is a section view taken along the line II–II' of FIG. 7.

Referring to FIGS. 7 and 8, a first coupler 270 is joined to a disc holder 160b, and a second coupler 280 is joined to the rotatable shaft 134 of a spindle motor 131. An insertion portion 117, into which the disc holder 160b and the first coupler 270 are insertable, is provided at a tray 110. The disc holder 160b has a joining portion 161, a fixing portion 165, and a friction member 164. Since the joining portion 161, the fixing portion 165, and the friction member 164 are similar to those of the disc holder 160a shown in FIG. 4 previously described, the description thereof is omitted. In addition, the disc holder 160b has a first connecting portion 166 connectable to the first coupler 270. The first coupler 270 has a second connecting portion 271 connectable to the first connecting portion 166. The disc holder 160b and the first coupler 270 are insertable into the insertion portion 117 from the top and bottom of the tray 110, respectively. By fitting the first connecting portion 166 and the second connecting portion 271 to each other, the disc holder 160b is installed at the tray 110 so that the disc holder 160b is rotatable while being joined to the first coupler 270.

According to an aspect of the present invention, the first and second connecting portions 166 and 271 are formed so that the first connecting portion 166 is insertable into the inner side of the second connecting portion 271, and the first and second connecting portions 166 and 271 are formed oppositely. The outer diameter D3 of the second connecting portion 271 is slightly smaller than the inner diameter D4 of the insertion portion 117. In addition, a gap T2 between the disc holder 160b and the first coupler 270 is slightly greater than a thickness T1 of the tray 110 in the vicinity of the insertion portion 117. Therefore, the disc holder 160b is slightly moveable vertically and horizontally while installed. Various methods can alternatively be employed to join the disc holder 160b and the first coupler 270 to each other in addition to the aspect of the invention shown in FIGS. 7 and 8.

When the tray 110 is loaded completely, the first coupler 270 and the second coupler 280 are joined to each other, as shown in FIG. 8, as the spindle motor 131 is raised. The second coupler 280 has concave side surfaces, as shown in FIG. 7, and the first coupler 270 has inner convex side surfaces, not shown in FIG. 7, so that the first coupler 270 is joinable to the second coupler 280 in a male-female manner. When the spindle motor 131 rotates, the disc holder 160b is rotated together with the spindle motor. In addition, the first coupler 270 and the second coupler 280 may be a magnetic material, or at least portions of the first coupler 270 and the second coupler 280 may be formed to exhibit magnetic properties, so that the first coupler 270 and the second coupler 280 are joined to each other by magnetic force.

With this structure, the same effect as previously described for the aspect of the invention shown in FIG. 3 is obtained. In addition, when the tray 110 is loaded, the rotation axis of the disc holder 160b may be slightly out of line with that of the spindle motor 131. In this case, the first coupler 270 and the second coupler 280 are still joinable to each other since the disc holder 160b is freely moveable to some extent, and the disc 90 is rotated stably. Furthermore, since the disc holder 160b is fitted to and seated on the spindle motor 131 without contacting the tray 110, when the first coupler 270 and the second coupler 280 are joined to each other, the relative height of the optical pickup 132 to the disc 90 is not affected by the height of the tray 110 but rather by the heights of the pickup 132 and the spindle motor 131 recording/reproducing information onto/from the disc is stably performed.

Figure 9:
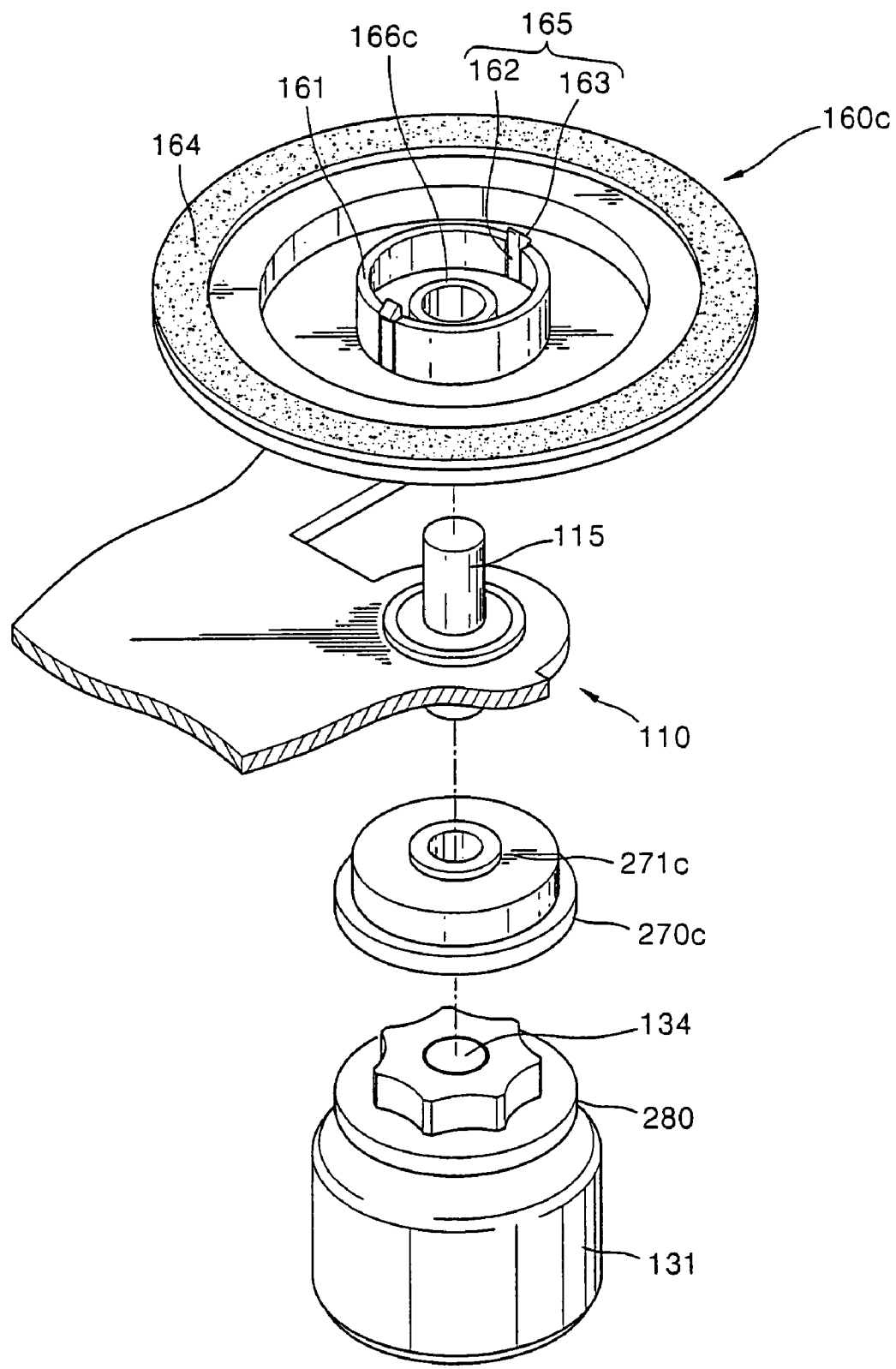
FIGS. 9 and 10 are exploded perspective views of other examples of a power transmitter.

FIG. 9 is an exploded perspective view of power transmitting according to another aspect of the present invention.

Referring to FIG. 9, a rotatable shaft 115 is installed at a tray 110 to be rotated. A disc holder 160c is joined to one end of the rotatable shaft 115, and a first coupler 270c is joined to the other end of the rotatable shaft 115. The disc holder 160c is similar to the disc holder 160b shown in FIGS. 7 and 8 except that a first connecting portion 166c is joinable to the rotatable shaft 115. The first coupler 270c is similar to the first coupler 270 shown in FIGS. 7 and 8 except that a second connecting portion 271c is joinable to the rotatable shaft 115. A second coupler 280 is joinable to the rotatable shaft 134 of a spindle motor 131. The effect attained by this structure is the same as previously described for the aspects of the present invention shown in FIGS. 6 through 8.

Figure 10:
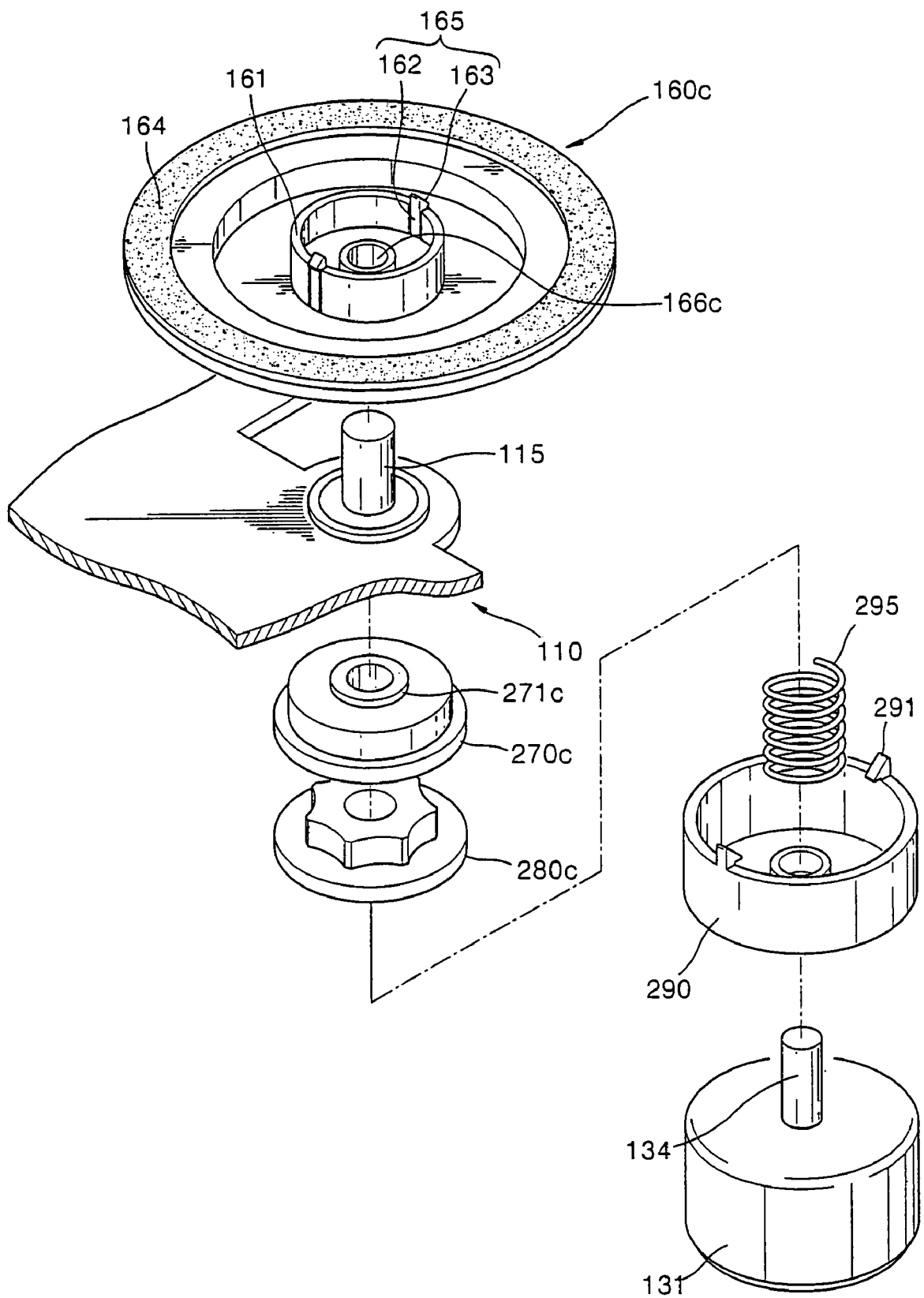

FIG. 10 is an exploded perspective view of power transmitting according to another aspect of the present invention means.

A second coupler 280c is installed to elastically move in the direction of the rotatable shaft 134 of the spindle motor 131. Referring to FIG. 10, a supporting member 290 fixable to the rotatable shaft 134 of the spindle motor 131, the second coupler 280c moveable along the shaft 134, and an elastic member 295 interposed between the supporting member 290 and the second coupler 280c to elastically bias the second coupler 280c upward are shown. Hooks 291 are provided at the supporting member 290. The second coupler 280c is inserted into the inner side of the supporting member 290, and the outer circumferential portions of the second coupler 280c are hooked by the hooks 291. The second coupler 280c is elastically moved in a vertical direction while inserted in the supporting member 290. The second coupler 280c is similar to the second coupler 280 shown in FIGS. 7 and 8 except that the second coupler 280c is installable around the rotatable shaft 134 of the spindle motor 131 so as to be moveable in the direction of the shaft 134.

In the aspect of the present invention shown in FIG. 9, a height of raising the spindle motor 131 must be controlled to conform to a loading position of the tray 110. Otherwise, the first coupler 270 and the second coupler 280 may collide with each other. On the other hand, according to this aspect of the present invention, since the second coupler 280c is elastically connected to the first coupler 270 with the elastic member 295, a possibility of damage is reduced even when the raised height of the spindle motor 131 is not exactly controlled. In addition, since the second coupler 280c is elastically connected to the first coupler 270, the rotational force of the spindle motor 131 is stably transmitted to the disc holder 160c.

Figure 11:
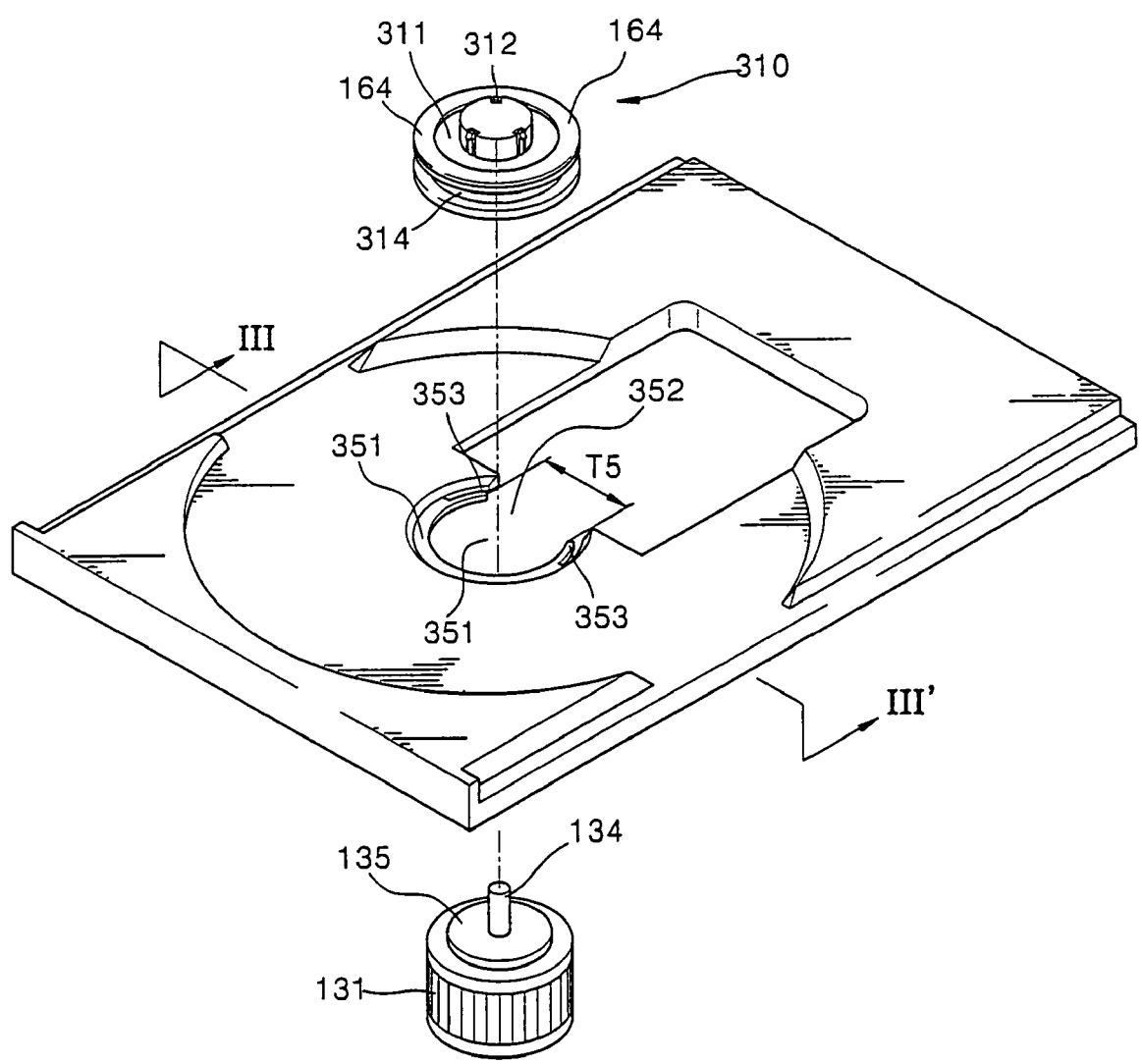
FIG. 11 is an exploded perspective view illustrating one example of a power transmitter using a magnetic material.
Figure 12:
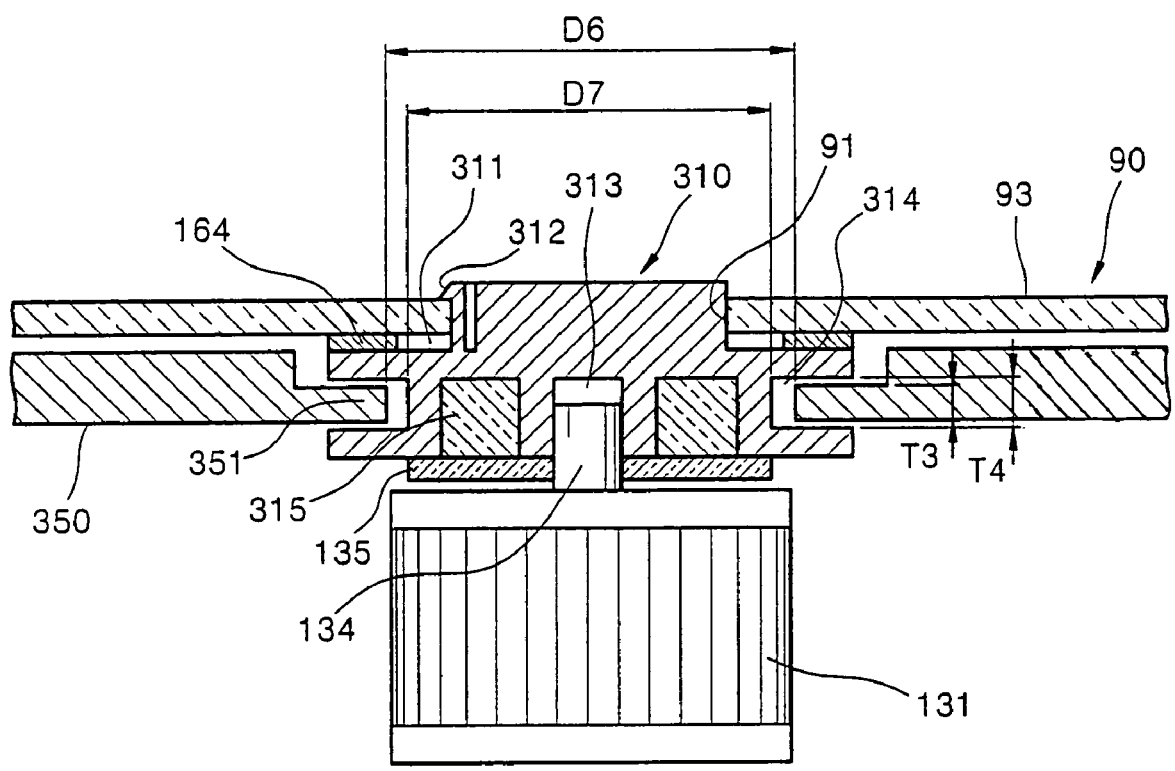
FIG. 12 is a section view taken along the line III–III' of FIG. 11.

Alternatively, a power transmitter utilizes a magnetic material. FIG. 11 is an exploded perspective view illustrating still another aspect of the present invention and a power transmitter. FIG. 12 is a section view taken along the line III–III' of FIG. 11.

Referring to FIGS. 11 and 12, a mounting surface 311 is provided on a disc holder 310, and a friction member 164 is provided on the mounting surface 311. The disc holder 310 has hooks 312 elastically connectable to a clamping hole 91 of a disc 90 so as to fix the disc 90. The disc holder 310 further has an insertion hole 313 formed at a lower portion of the disc holder 310 so that the rotatable shaft of a spindle motor 131 is insertable into the insertion hole 313. In addition, a concave engagement groove 314 is provided at the outer circumferential surface of the disc holder 310.

The optical disc drive operates such that the rotational force of the spindle motor 131 is transmitted to the disc holder 310 via magnetically connected members. A magnet 135 is joined to the rotatable shaft 134 of the spindle motor 131, and a member 315 such as an iron piece is magnetically attachable to the magnet 135. The rotatable shaft 134 of the spindle motor 131 projects slightly from the magnet 135. The member 315 is attached to the disc holder 310. In addition, the whole disc holder 310, or at least a portion thereof, is formed with a material which is magnetically attached to the magnet 135. Alternatively, the member 315 is a magnet, and the member 135 is an iron piece or other material which is magnetically attachable to the magnet 315. Alternatively, both reference numerals 135 and 315 are magnets.

A guiding portion 351 is provided at a tray 350. The guiding portion 351 has a convex shape so as to engage with the engagement groove 314. The diameter D6 of the guiding portion 351 is slightly greater than the inner diameter D7 of the engagement groove 314. The width T4 is slightly greater than the thickness T3 of the guiding portion 351. An opening 352 is at a side of the guiding portion 351. Elastic arms 353 are at both sides of the opening 352. The distance D5 between the elastic arms 353 is smaller than the inner diameter D7 of the engagement groove 314. When the disc holder 310 is pushed into the guiding portion 351 through the opening 352, the disc holder 310 is inserted into the guiding portion 351 while the distance between the elastic arms 353 is slightly increased by the pushing force. When the disc holder 310 is completely inserted into the guiding portion 315, the elastic arms 353 elastically return to their original positions, and prevent the disc holder 310 from escaping from the guiding portion 351 through the opening 352. The tray 350 is similar to the tray 110 previously described except that the tray 350 has a structure for installing the disc holder 310.

The disc 90 is seated on the friction member 164 and is fixed to the disc holder 310 by the hooks 312. When the tray 350 is loaded, the spindle motor 131 is raised toward the tray 350, as previously described for the aspect of the invention shown in FIG. 6. The disc holder 310 is attached to the magnet 135 by the magnetic force acting between the magnet 135 and the member 315. While the rotatable shaft 134 of the spindle motor 131 is inserted into the insertion hole 313 of the disc holder 310, the disc holder 310 is positioned to be concentric with the spindle motor 131. As described above, the width T4 of the engagement groove 314 is slightly greater than the thickness T3 of the guiding portion 351, and the inner diameter D7 of the engagement groove 314 is slightly greater than the diameter D6 of the guiding portion 351. Therefore, when the spindle motor 131 is completely raised, the disc holder 310 is raised to a position so as not to interfere with the guiding portion 351 as shown in FIG. 12. The spindle motor 131 and the disc holder rotate together. With this structure, discs having various diameters and discs having various shapes are loaded stably.

Figure 13:
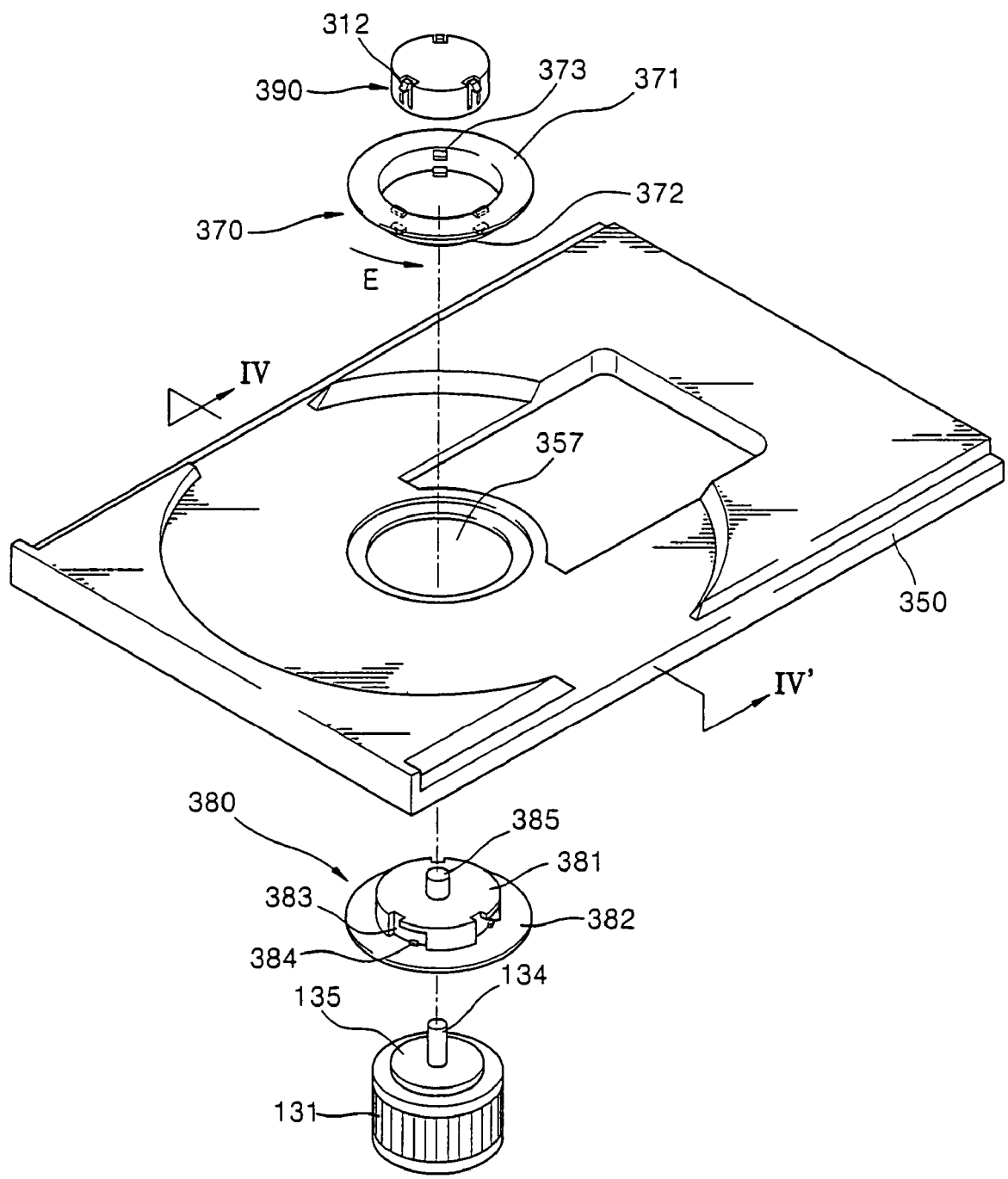
FIG. 13 is an exploded perspective view illustrating another example of a power transmitter using a magnetic material.
Figure 14:
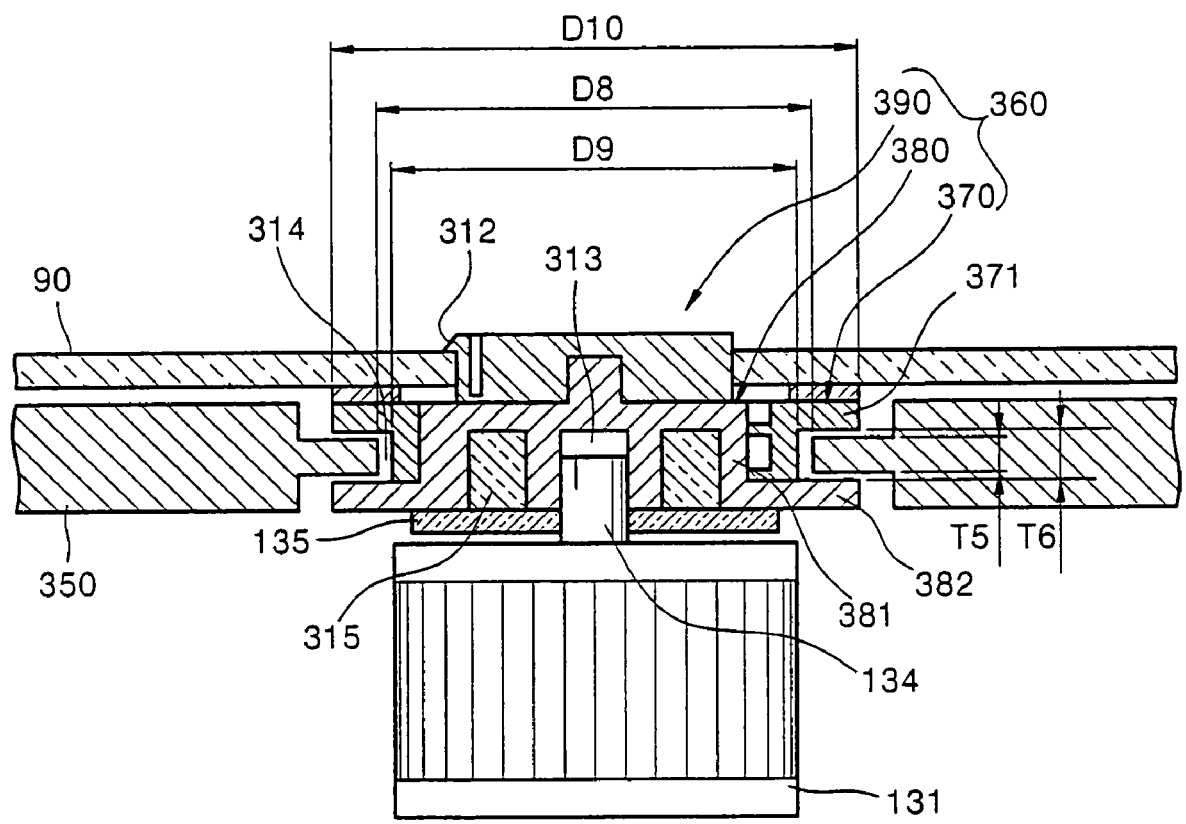
FIG. 14 is a section view taken along the line IV–IV' of FIG. 13.

FIG. 13 is an exploded perspective view illustrating another aspect of the present invention having a power transmitter using a magnetic material. FIG. 14 is a section view taken along the line IV–IV' of FIG. 13.

Referring to FIGS. 13 and 14, a tray 350 with a circular through opening 357, and a disc holder 360 joined to the opening 357 to be freely movable to a slight extent, are shown. The disc holder 360 has a first member 370, a second member 380, and a fixing member 390 having hooks 312 elastically joinable to the clamping hole 91 of the disc 90 so as to fix the disc 90 to the disc holder 360. The first member 370 is a ring-shaped member having an outer ring 371 and an inner ring 372. Three projections 373 projected toward the inner side of the inner ring 372 are provided at the inner ring 372. The second member 380 has a cylindrical portion 381 around which the inner ring 372 is fitted, and a wing portion 382 the diameter of which is greater than that of the cylindrical portion 381. The cylindrical portion 381 has three recessed portions 383 recessed from the outer circumference thereof. A snap projection 384 to make a snap-fit engagement with the projection 373 is provided at the recessed portions 383. An insertion hole 313, into which the rotatable shaft 134 of a spindle motor 131 is insertable, is provided at the lower portion of the second member 380. The outer diameter D9 of the inner ring 372 is slightly smaller than the diameter D8 of the opening 357. The outer diameter D10 of the outer ring 371 and the wing portion 382 is slightly greater than the diameter D8 of the opening 357. The distance T6 between the outer ring 371 and the wing portion 382 is slightly greater than the depth T5 of the opening 357. The outer ring 371 and the wing portion 382 serve as the engagement groove 314 shown in FIGS. 11 and 12.

The first member 370 and the second member 380 are insertable into the opening 357 from the upper side and the lower side of the tray 350, respectively. The inner ring 372 is fittable around the cylindrical portion 381, and the first member 370 is turned in the direction of arrow E of FIG. 13. When the projection 373 and the snap projection 384 are snap-fit engaged, the first and second members 370 and 380 are joined to each other. The fixing member 390 is integrally formed with the first member 370 or the second member 380, and joined to the first member 370 or the second member 380. According to an aspect of the present invention, the fixing member 390 is joined to a boss 385 formed to project from the second member 380. A member 315 is magnetically attached to a magnet 135 and joined to the lower portion of the second member 380. In addition, at least one of the first member 370 and the second member 380 is formed with a material that is magnetically attached to the magnet 135.

With this structure, the similar operational effects as previously described for the aspects of the present invention shown in the embodiment of FIGS. 11 and 12 are obtained.

Figure 15:
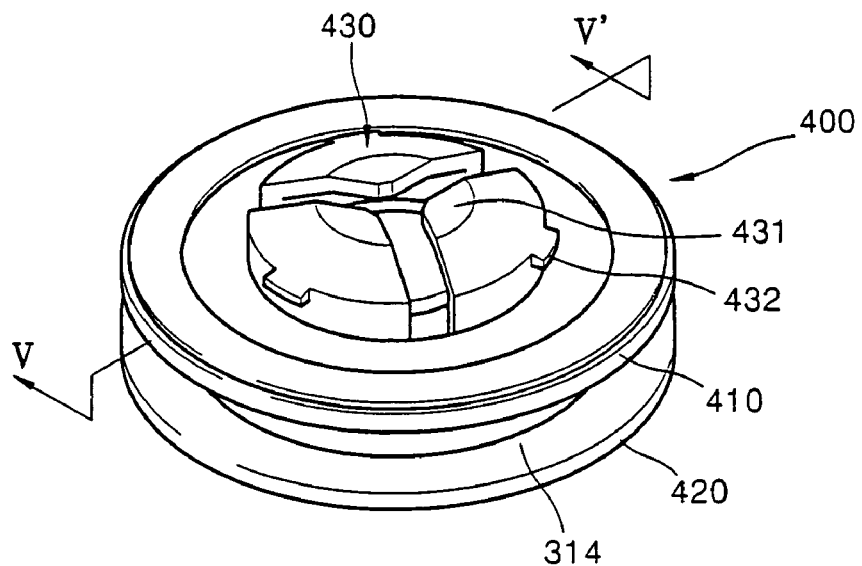
FIG. 15 is a perspective view illustrating still another embodiment of a disk holder.
Figure 16:
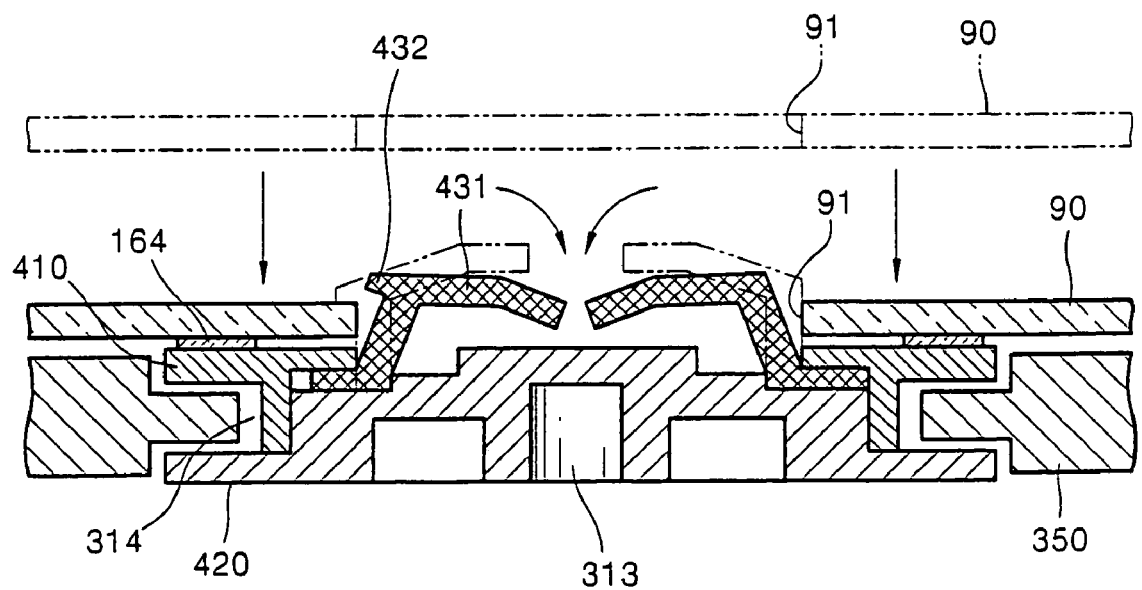
FIG. 16 is a section view taken along the line V–V' of FIG. 15.

FIG. 15 is a perspective view illustrating still another aspect of a disc holder, and FIG. 16 is a section view taken along the line V–V' of FIG. 15.

Referring to FIGS. 15 and 16, a first member 410 and a second member 420 joinable to each other to form an engagement groove 314 are shown. Reference numeral 430 is a fixing member. Since the other components and parts are similar to the components and parts shown in FIGS. 11 through 14, the descriptions thereof will be omitted. The fixing member 430 has three elastically deformable arms 431, and three hooks 432 to hook edge portions of a disc 90 are provided at the respective arms 431. After the fixing member 430 is seated on the second member 420, the first member 410 is attached or snap-fit as described previously in conjunction with aspects of the present invention shown in with reference to FIGS. 13 and 14, and fitted to the second member 420 from the upper side of the fixing member 430. A disc holder 400 is then formed. The disc holder 400 is installed at a tray 350 as shown in FIGS. 11 and 12, or as shown in FIGS. 13 and 14.

When the disc 90 is fitted to the fixing member 430, the arms 431 are elastically deformed inward as shown in FIG. 16. When the disc 90 is seated on a friction member 164, the arms 341 return to the original positions shown by the broken lines in FIG. 16. The hooks 432 hook edge portions of the clamping hole, and accordingly the disc 90 is fixed to the disc holder 400.

As described above, with the optical disc drive according to aspects of the present invention, since the position of the disc with respect to the spindle motor is made constant by fixing the disc to the disc holder, discs having various sizes and shapes, such as fashion discs, are loaded stably. In addition, even when the optical disc drive is installed as a vertical type drive, discs having various sizes and shapes are loaded stably.

Although a few embodiments of the present invention have been shown and described, it would be appreciated by those skilled in the art that changes may be made in these embodiment without departing from the principles and spirit of the invention, the scope of which is defined in the claims and their equivalents.

What is claimed is:

1. An optical disc drive for a disc, comprising:
a main body;
a spindle motor attached to the main body;
a tray attached to the main body so as to be loadable/ unloadable into/from the main body; and
a disc holder rotatable by the spindle motor when the tray is in a loaded position, and joinable to a clamping hole of the disc so as to fix the disc,
wherein
the spindle motor is installed to be movable in an upward and downward direction with respect to the disc holder,
the disc holder is connectable to the spindle motor by a magnetic force therebetween, to be rotated by the spindle motor, and
the disc holder comprises an engagement portion recessed inwardly at a side surface of the disc holder, and
the tray comprises:
a guiding portion having an opening formed at a side thereof, and
elastic arms at the opening, to prevent the disc holder from escaping from the guiding portion through the opening,
wherein the engagement portion is engageable with the guiding portion, and the disc holder is insertable into the guiding portion through the opening.

2. The optical disc drive according to claim 1, wherein the optical disc drive further comprises:
a rotatable shaft installed through the tray with the disc holder joinable to one end of the rotatable shaft; and
a first gear joinable to the other end of the rotatable shaft, wherein the spindle motor has a second gear connectable to the first gear.

3. The optical disc drive according to claim 1, further comprising a first coupler joinable to the disc holder, and a second coupler is provided on the rotatable shaft of the spindle motor to be connectable to the first coupler in a male-female manner as the spindle motor moves upward.

4. The optical disc drive according to claim 3, wherein the first coupler and the second coupler are magnetically attachable to each other.

5. The optical disc drive according to claim 1, wherein the optical disc drive further comprises:
a first rotatable shaft installed through the tray with the disc holder joinable to one end of the first rotatable shaft; and
a first coupler joinable to the other end of the first rotatable shaft, and a second coupler provided at a second rotatable shaft of the spindle motor to be connectable to the first coupler in a male-female manner as the spindle motor moves upward.

6. The optical disc drive according to claim 5, wherein the second coupler is installed to be elastically movable along the length of the second rotatable shaft of the spindle motor.

7. The optical disc drive according to claim 1, wherein a magnet is joined to the second rotatable shaft of the spindle motor, and at least a portion of the disc holder is formed with a material magnetically attachable to the magnet.

8. The optical disc drive according to claim 1, wherein at least a portion of the disc holder is formed with a magnet, and a member made of a material magnetically attachable to the magnet is joined to the second rotatable shaft of the spindle motor.

9. The optical disc drive according to claim 1, wherein an insertion hole is provided in the disc holder, and the second rotatable shaft of the spindle motor is insertable into the insertion hole.

10. The optical disc drive according to claim 1, wherein the tray comprises a circular opening, and the disc holder comprises a first member and a second member vertically joinable to each other to form an engagement groove that is engageable with the circular opening,
wherein the first member and the second member are joinable to each other from a top side and a bottom side of the tray through the opening, to install the disc holder on the tray to be rotated.

11. The optical disc drive according to claim 10, wherein an insertion hole is formed at the second member so that the rotatable shaft of the spindle motor is insertable into the insertion hole.

12. An optical disc drive for a disc, comprising:
a tray with a circular through opening;
a spindle motor; and
a disc holder joined to the opening, and magnetically joined to the spindle motor and rotated by the spindle motor when the tray is loaded, wherein the disc holder comprises:
a first member and a second member, and
a fixing member having hooks elastically joinable to the clamping hole of the disc so as to fix the disc to the disc holder,
wherein the first member is a ring-shaped member having an outer ring and an inner ring, and a plurality of projections are projected toward the inner side of the inner ring.

13. The optical disc drive according to claim 12, wherein the second member has a cylindrical portion around which the inner ring is fitted, and a wing portion the diameter of which is greater than that of the cylindrical portion.

14. The optical disc drive according to claim 13, wherein the cylindrical portion has a plurality of recessed portions recessed from the outer circumference thereof, and a snap projection to make a snap-fit engagement with the projection is provided at the recessed portions.

15. An optical disc drive for a disc, comprising:
a tray with a circular through opening;
a spindle motor; and
a disc holder joined to the opening, and magnetically joined to the spindle motor and rotated by the spindle motor when the tray is loaded, wherein the disc holder comprises:
a first member and a second member, and
a fixing member having hooks elastically joinable to the clamping hole of the disc so as to fix the disc to the disc holder,
wherein a lower portion of the second member has an insertion hole into which a rotatable shaft of a spindle motor is insertable.

16. The optical disc drive according to claim 13, wherein an outer diameter of the inner ring is slightly smaller than a diameter of the opening, an outer diameter of the outer ring and the wing portion is slightly greater than the diameter of the opening, and a distance between the outer ring and the wing portion is slightly greater than a depth of the opening.

17. An optical disc drive for a disc, comprising:
a tray with a circular through opening;
a spindle motor; and
a disc holder joined to the opening, and magnetically joined to the spindle motor and rotated by the spindle motor when the tray is loaded, wherein the disc holder comprises:
a first member and a second member, and
a fixing member having hooks elastically joinable to the clamping hole of the disc so as to fix the disc to the disc holder,
wherein the first member and the second member are insertable into the opening from the upper side and the lower side of the tray, respectively.

18. The optical disc drive according to claim 14, wherein the inner ring is fittable around the cylindrical portion, and when the projection and the snap projection are snap-fit engaged, the first and second members are joined to each other.

19. An optical disc drive for a disc, comprising:
a tray with a circular through opening;
a spindle motor; and
a disc holder joined to the opening, and magnetically joined to the spindle motor and rotated by the spindle motor when the tray is loaded, wherein the disc holder comprises:
a first member and a second member, and
a fixing member having hooks elastically joinable to the clamping hole of the disc so as to fix the disc to the disc holder,
wherein the fixing member is joined to a boss projecting from the second member.

20. An optical disc drive for a disc, comprising:
a tray with a circular through opening;
a spindle motor; and
a disc holder joined to the opening, and magnetically joined to the spindle motor and rotated by the spindle motor when the tray is loaded, wherein the disc holder comprises:
a first member and a second member, and
a fixing member having hooks elastically joinable to the clamping hole of the disc so as to fix the disc to the disc holder,
wherein at least one of the first member and the second member is formed with a material that is magnetically attached to a magnet.

* * * * *